United States Patent Office 2,750,862
Patented June 19, 1956

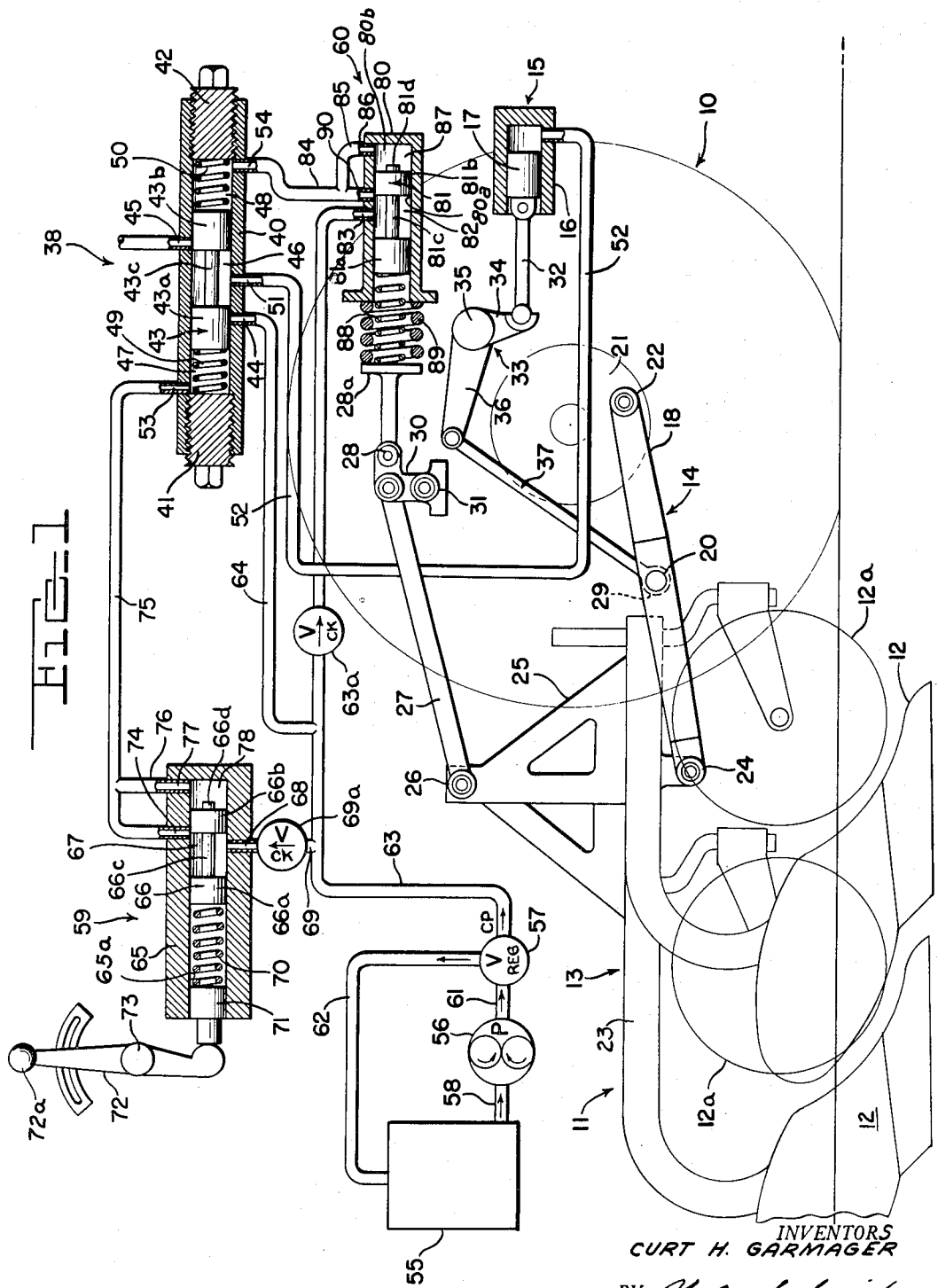

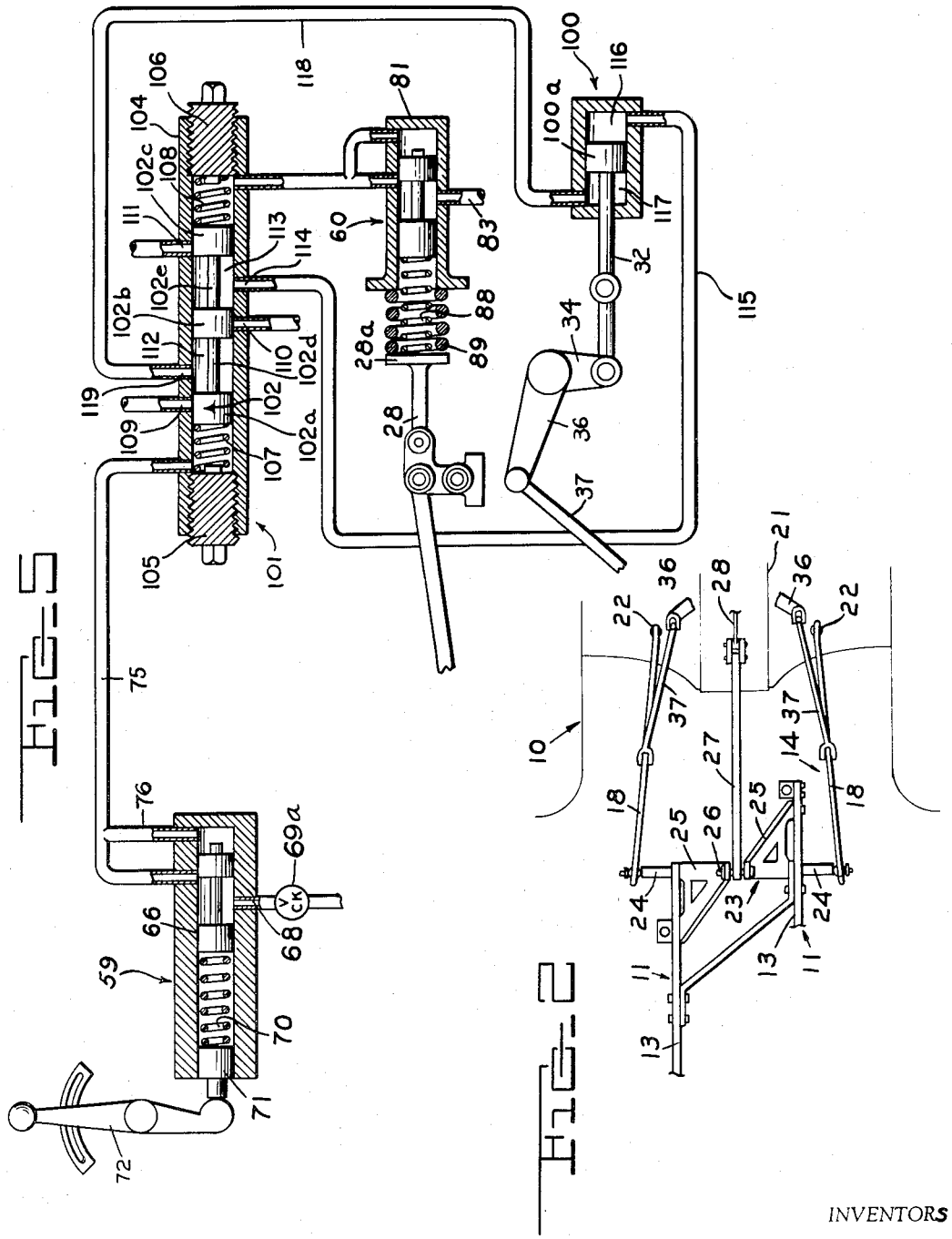

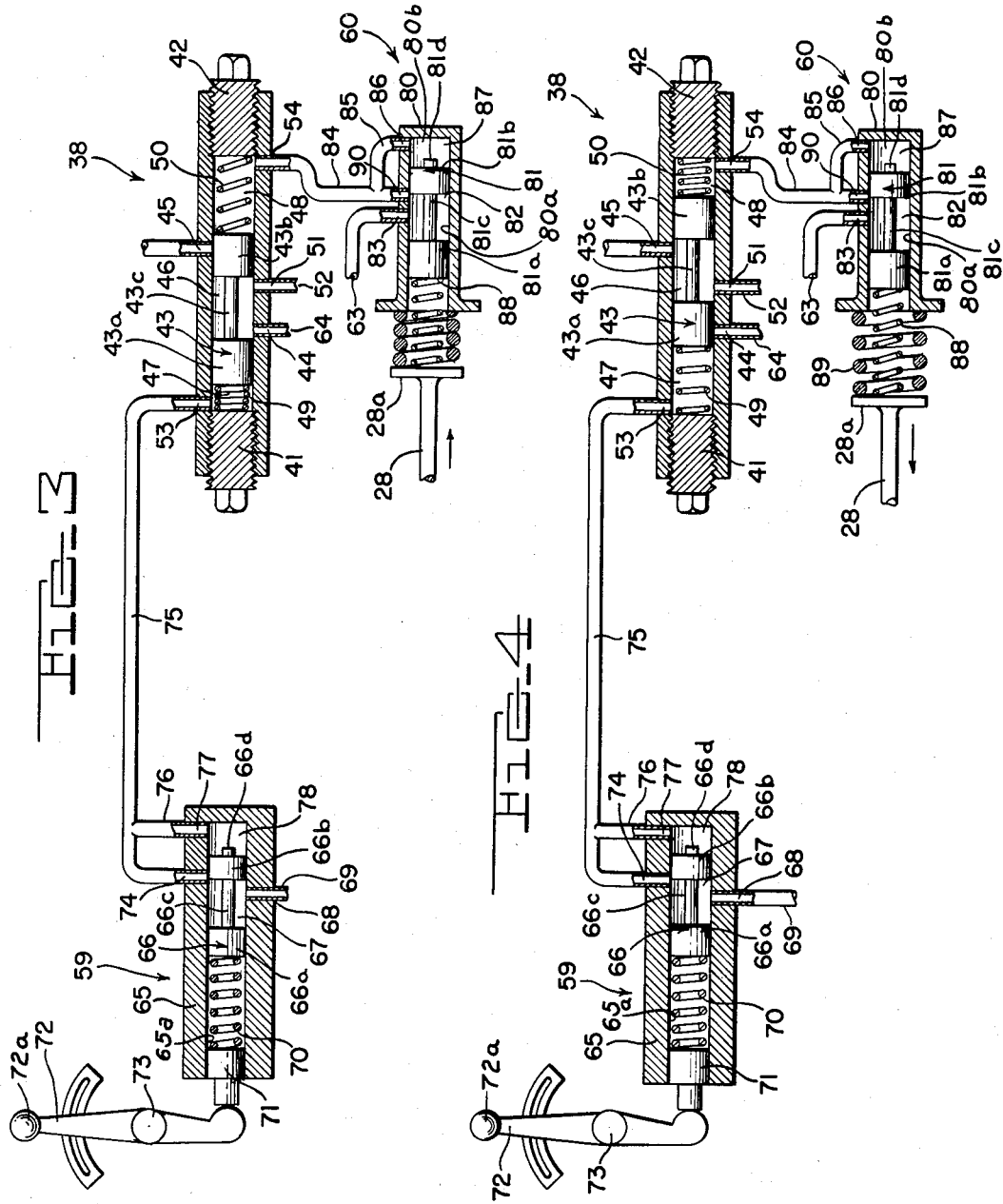

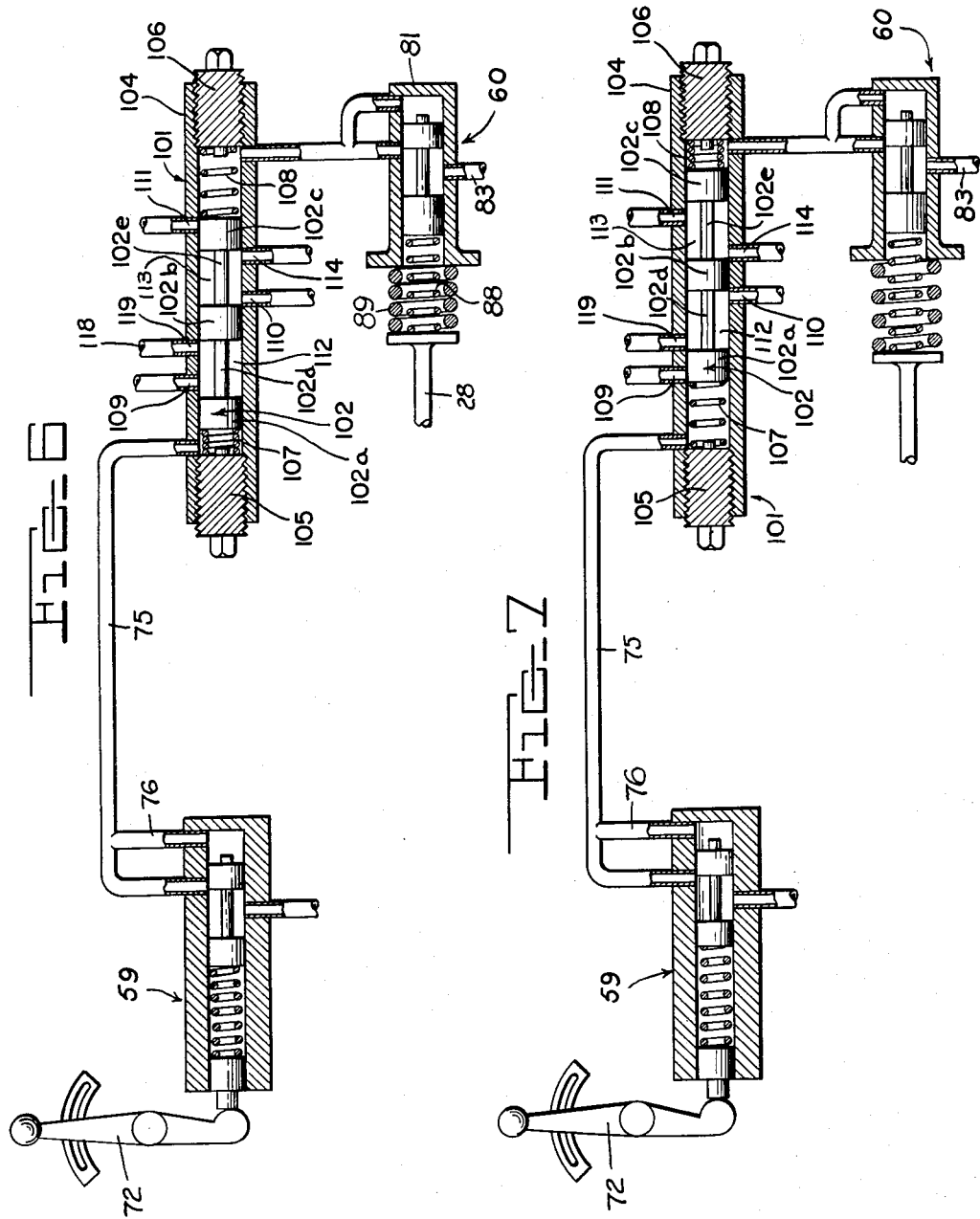

2,750,862

HYDRAULIC CONTROL SYSTEM FOR TRACTORS

Curt H. Garmager, Royal Oak, Mich., assignor, by mesne assignments, to Ford Motor Company, Dearborn, Mich., a corporation of Delaware Application August 9, 1950, Serial No. 178,516

5 Claims. (Cl. 97—46.07)

This invention relates to power demand control apparatus, and more especially to apparatus for controlling the vertical adjustment and power demand of earth working implements.

An object of this invention is the provision of power demand control apparatus for traversing earth working implements such as tractor propelled plows, scrapers, harrows, seed planters, cultivators, or the like, which apparatus so controls the working level of the implement in the earth that the implement power demand throughout the earth working function or functions is substantially constant.

Another object of this invention is the provision of power demand control apparatus for traversing earth working implements, the control apparatus being automatic and sensitive to variations in load encountered by the implement, and which apparatus effectively controls vertical adjustment of the implement to maintain substantially constant value of power demand irrespective of variations in the terrain or soil conditions.

A further object of this invention is that of providing power demand control apparatus for a vertically adjustable earth working implement, to control position of the latter in the earth to maintain a substantially constant value of power demand and to protect both the implement and the source of power against overload and damage.

A still further object of this invention is the provision of power demand control apparatus for an implement of the character indicated, which apparatus is capable of controlling vertical adjustment of the implement to impart substantially constant power demand characteristics thereto throughout the earth working function or functions, and which apparatus is amenable to selective manual setting to any of a plurality of operating positions individually corresponding to a different, substantially constant value of power demand.

Other objects of this invention in part will be obvious and in part pointed out more fully hereinafter.

The specific nature of this invention, as well as other objects and advantages thereof, will become apparent to those skilled in the art from the following detailed description, taken in conjunction with the attached sheet of drawings on which, by way of preferred example only, is illustrated certain preferred embodiments of this invention.

On the drawings:

Fig. 1 is a schematic view of a system of apparatus wherein a plow is draft-coupled to a tractor, and which embodies power demand control means for keeping the draft demand of the earth working implement to a substantially constant value;

Fig. 2 is a plan view showing certain details of a draft coupling employed between the plow and tractor;

Figs. 3 and 4 represent different operating positions of a portion of the apparatus shown in Fig. 1;

Fig. 5 is a schematic view representing a modified embodiment of the power demand control apparatus; and Figs. 6 and 7 represent different operating positions of the apparatus depicted in Fig. 5.

As shown on the drawings:

As conducive to a clearer understanding of certain features of this invention, it may be noted at this point that engine power operated earth working implements are now in widespread demand especially in agricultural applications. Implements such as plows, harrows, seeders, cultivators, diggers, drags, or any of a host of other implements, are available on the market for engine power operation as for example by draft connection to a tractor. In being drawn or otherwise propelled to achieve the intended earth working function or functions, the implements encounter the earth and accordingly expose the source of power to load which varies in intensity with such factors as depth or level of operation of the implement and the quality and density of the soil.

A variety of the heretofore known earth working implements have manually controlled means for elevating and lowering the earth working portion or portions thereof to change the level of operation. In the instance of certain implements pushed or drawn by a tractor, the implement is suspended on lift bars from the tractor and may be manually set to any one of a number of levels. Upon arriving at a particular level, the implement is drawn or pushed as the case may be to achieve earth working function or functions in accordance with the particular setting. The rigid maintenance of a given level of working the earth, however, ignores the fact that objectionable variations in the earth load are often imposed on the source of power. Should a heavy obstruction be encountered by the earth working portion or portions of the implement, stresses are suffered by the implement itself which lead to distortions, breakage, and to stalling of the tractor.

An outstanding object of this invention accordingly is the provision of practical and reliable automatic control apparatus for keeping the power demand of an earth working implement to a pre-selected substantially constant value.

Referring now more particularly to the practice of this invention, I provide apparatus for keeping the power demand of an earth working implement to a pre-selected substantially constant value, i. e., the power demanded from the prime mover for the implement to traverse and work the earth. Such apparatus includes lift means which is operative to change the working level of the implement in the earth and accordingly to alter actual power demand of the traversing implement. Of further consequence, the apparatus includes power demand preselection means and lift-operation control means which, upon deviation of the power demand of the implement from the pre-selected substantially constant value of power demand, effects operation of the lift means for change of the working level of the implement in the earth in the direction to give the substantially constant value of power demand, and stops operation of the lift means when the implement reaches the working level in the earth required to achieve the pre-selected substantially constant value of power demand.

In certain embodiments the apparatus which I provide conveniently serves such purposes as controlling the working level of a lift-type earth working implement draft-coupled to a tractor, to maintain the draft load which the implement imposes on the tractor substantially constant. Such apparatus, in keeping the implement power demand to a substantially constant value, tends to increase the operating efficiency of the source of power on which demand is made. Under normal operating conditions the earth engaging portion or portions of the implement remain in the earth at a level or levels which give an earth load consistent with producing the substantially constant value of power demand. The imposition of surges of overload or underload on the source of power by the implement is successfully reduced in that this apparatus automatically conditions the earth working implement for raising or lowering to attain a level in the earth which is consistent with the substantially constant power demand. Of further importance, the apparatus which this invention provides, conditions the implement for raising should an obstruction be encountered in or on the earth which tends to increase the power demand beyond the substantially constant value. In this manner the apparatus of this invention serves to protect the implement from damage by obstructions.

In the embodiment of this invention represented in Fig. 1 of the accompanying drawing, a form of the apparatus of this invention serves to keep the power demand of a plow 11 on a draft tractor 10 to a pre-selected substantially constant value. In this, the plow illustratively includes conventional plow bottoms 12 and coulters 12a for working the earth. A draft coupling 14 employed in the present instance (see Figs. 1 and 2) includes spaced drawbars or hitch links 18 respectively pivotally connected at their forward ends to the rear axle housing 21 of the tractor frame at 22, the latter connections being pivotal for allowing the drawbars to be rotated up and down to raise and lower the plow 11. The rear ends of the drawbars are pivotally connected to a cross shaft 24 which is transversely secured in conventional fashion to the plow beams 23 of the plow 11. Rigidly fastened to the top of the plow frame 13 is an upstanding A-frame portion 25 having its top end pivotally connected at 26 to the rear end of a top link 27. At its forward end the link 27 is pivoted to a rod 28 which transmits a function of the actual power demand of the plow 11 to a helical resisting spring 88, the latter accordingly initiating functions which will be described more fully hereinafter. A radial link 30 pivoted at 31 to the tractor differential housing has its opposite end in the pivotal connection between top link 27 and rod 28 for directing movement of the latter two elements.

In the present instance a hydraulic lift motor 15, suitably mounted to the frame of tractor 10 and having a cylinder 16 and piston 17 for operation in the cylinder, forms a portion of the power demand control apparatus. In being operative for change of the working level of the plow, the motor conveniently has a piston rod 32 connected with an arm 34 of a power lift mechanism 33. Arm 34 is rigidly attached to a transverse shaft 35 which is suitably journaled on or in the tractor frame. A pair of lift arms 36 are secured to shaft 35 at spaced points and are respectively connected to draft links 18 by means of links 37 so as to transmit lifting force of the hydraulic motor 15 to the plow, and conversely, the force of gravity on the plow to the motor.

The source of pressured hydraulic fluid for operating fluid motor 15 is also carried on the tractor frame and comprises conventional elements which have been shown schematically in Fig. 1. Thus there is provided an oil reservoir 55, and a pump 56, which can be driven by the tractor engine in any well known fashion. The reservoir 55 has line 58 leading from the bottom thereof for feeding oil to the pump 56. Passing from the output side of this pump is a feed line 61 for the pressured fluid, this being connected to the fluid input side of the constant pressure output valve 57. The valve 57 is for example of a type which achieves its pressure control functions with the aid of a bleed line 62 for returning fluid to the reservoir. A line 63 leading from the output side of the latter valve supplies fluid under constant pressure to the entire hydraulic system as will be described.

For controlling operation of the lift motor 15, I employ a master hydraulic control valve 38 mounted on the tractor 10. This valve in the present embodiment is constructed so that the piston 43 thereof has a neutral intermediate position where it is exposed to substantially equal opposed forces, and the motor 15 is cut off from the hydraulic system, and two control positions which respectively add fluid to, or withdraw fluid from the motor 15, should substantial differences in the normally balanced forces accrue. One of these forces represents the actual power demand of the earth working implement and the other represents a pre-selected substantially constant power demand. An unbalance of the valve 38, as represented by increase or decrease of the actual power demand on the tractor from the preselected constant value, renders the fluid motor 15 operative to change the vertical position or working level of the plow 13 in the earth commensurate with maintaining the pre-selected substantially constant value of draft demand on the tractor 10.

Valve 38 preferably is a shuttle valve, this for example having a cylindrical casing or sleeve 40 closed off at internally threaded ends by plugs 41 and 42 respectively mating with the threaded ends. A piston 43 fits the bore of the sleeve for longitudinal sliding movement so as to control radial ports 44 and 45 extending through the sleeve wall. Port 44 conveniently is an inlet port for fluid under pressure which is to be delivered to the lift motor 15 from supply pipe 63, and port 45 conveniently is an outlet, leading to the sump or reservoir 55 of the hydraulic system. The valve piston 43 advantageously comprises spaced piston portions 43a and 43b for respectively obturating the ports 44 and 45, these portions being sealed in any suitable manner to the bore surface of the sleeve 40 to prevent intermediate escape of fluid, and yet being free to slide longitudinally of the bore. A reduced diameter portion 43c of the piston 43 extends between portions 43a and 43b thus to form a unit with the same and yet provide a fluid receiving chamber 46 with the bore of the sleeve. Plugs 41 and 42 and the outer end faces of piston portions 43a and 43b serve with the sleeve 40 to form fluid chambers 47 and 48 at opposite ends of the selector valve piston 43. I usually employ helical springs 49 and 50, preferably of about the same size and strength, in the fluid chambers 47 and 48 and respectively compressed to the same extent between plugs 41 and 42 and the outer ends of piston 43. These helical springs tend to keep the valve piston in the neutral position, shown in Fig. 1, in which piston portions 43a and 43b respectively close the ports 44 and 45, leaving chamber 46 open only through a port 51 through the wall of sleeve 40. The threaded plugs 41 and 42 conveniently serve for adjustably compressing the helical springs 49 and 50 so as to modify bias on the piston 43 or allow adjustment of this piston relative to the sleeve 40 and its various ports. The plugs advantageously are large enough in size to permit insertion of piston 43 into the sleeve 40 from either end.

A feed line 52 for hydraulic fluid, preferably oil or the like, interconnects the valve chamber 46 and the communicating port 51 with lift motor 15. In one off-neutral or end position of the valve piston 43 (see Fig. 3) fluid inlet port 44 is connected to the chamber 46 which remains in communication with port 51 so that fluid can pass under pressure through a feed line 52 to operate the lift motor with exhaust port 45 closed. In the other off-neutral or end position of piston 43 (see Fig. 4) exhaust port 45 is connected to the motor 15 and the fluid inlet port 44 is closed, whereby the fluid in the motor 15 may be withdrawn.

Movement of the control valve piston 43 from neutral position and subsequently back again to neutral is achieved in the present embodiment by differences in opposing forces exerted against the outer ends of the piston 43 and by subsequent equalization of these forces as a result of the actions initiated by the system while the control valve is off-neutral.

The opposing forces are transmitted from two mechanisms, respectively capable of deriving a force which is a function of actual draft load of the plow 11 and an opposing force which is provided by a preselected substantially constant source of pressured fluid from the tractor hydraulic system. This force applying means for example includes two valves 59 and 60 which respectively transmit fluid forces to chambers 47 and 48 of the valve 38, at which points the forces are applied in opposition to each other to opposite ends of the valve piston 43, to move the latter in accordance with the deviation of actual draft demand of the implement from the pre-selected substantially constant value. The force applying means, such as the valves 59 and 60, preferably impose equal opposing forces on the opposite ends of valve piston 43 at neutral position of the latter, which corresponds to the condition where the actual power demand of the earth working implement is approximately equal to the pre-selected substantially constant value of power demand. The valves 59 and 60 preferably are mounted on the tractor 10 and are of a kind which effect valving functions to admit fluid under pressure respectively to the valve chambers 47 and 48 to provide the equal opposing forces at neutral position of the latter. Valve 59 will hereinafter be referred to as the pre-selection valve while valve 60 will be referred to as the power demand valve.

Chambers 47 and 48 of the valve 38 respectively have ports 53 and 54 through the casing wall for connection with the source of pressured fluid supply through valves 59 and 60.

The pre-selector valve 59 illustratively comprises a casing 65 having a longitudinal bore 65a extending from one end thereof and terminating short of the other end. Suitably sealed to the wall of this bore and slidable along the length of the same is a spool-type piston 66, and having spaced piston portions 66a and 66b and an intermediate reduced portion 66c forming a unit with the two piston portions. The chamber 67, formed between the reduced portion 66c and the surface of the bore 65a, has a fluid inlet port 68 through the casing wall, thus to receive pressured fluid from the source. For supplying the fluid, a line 69 connects the port with feed line 63 leading from the outlet side of regulating valve 57. Line 69 preferably includes a ball check valve 69a, or the like, to prevent the escape of fluid from valve 59 back into the line 63.

A helical spring 70 is disposed in the bore 65a and held compressed by a plunger 71 in the bore, which plunger may be slidably adjusted to any one of a number of different positions longitudinally along the bore for selectively introducing different amounts of compression to the spring 70. This selective setting conveniently is achieved by means of a manually controlled lever 72, which is pivoted at 73 to the tractor frame and has a handle portion 72a disposed within reach from the seat of the tractor. Suitable friction or locking devices (not shown) are provided for securing the lever 72 in any selected angular position. Chamber 67 of the valve 59 has another port 74 through the wall of the casing and this port is connected by means of fluid feed line 75 to chamber 47 of the lift motor control valve 38, the latter receiving the connection at port 53. Line 75 has a tap line 76 leading therefrom to a port 77 through the casing of valve 59, for passing fluid to and from a chamber 78 formed beyond the inner end of the piston 66. The adjacent face of portion 66b of the piston has a reduced extension 66d which cooperates with the end wall of casing 65 to prevent full closure of port 77 under the thrust of spring 70.

It will therefore be seen that the pre-selector valve 59 functions to produce a discharge pressure in the feed line 75 which is a pre-selected reduced proportion of the full pressure developed by the regulating valve 57 and supplied to the pre-selector valve 59 through the fluid inlet port 68. Dependent upon the selected angular setting of the manual control lever 72, the piston 66 of pre-selector valve 59 always tends to assume a position relative to inlet port 68 and outlet port 74 which will produce sufficient pressure in chamber 78, and hence in feed line 75, to balance the opposing force exerted by the spring 70. The force of spring 70 is, of course, a function of this angular position of the manual control lever 72. It is, accordingly, apparent that the fluid pressure exerting within the fluid chamber 47 of the master control valve 38 will always be in fixed proportion to the angular setting of the manual control lever 72, hence the axial force on the piston 43 of the master control valve 38 which operates on such piston in the direction to cut off the supply of fluid from the source to the lift motor 15 is likewise a function of the angular position of the manual control lever 72. Thus, it can be said that the forces tending to urge the piston 43 of master control valve 38 to the right, as viewed in Fig. 1, will be a function of a pre-selected value of power demand.

As previously indicated, an opposing force on piston 43, which is a function of the actual power demand required by the implement, is derived by the power demand valve 60. Power demand valve 60 conveniently includes a casing 80 having a longitudinal bore 80a extending into the body thereof and terminating on the inside. Slidable along the wall of this bore and suitably sealed to the same is a piston 81 in the form of a spool, having spaced piston portions 81a and 81b and an intermediate portion 81c of reduced size defining a chamber 82 for fluid inside the casing. Line 63 from the outlet side of constant pressure regulating valve 57 extends to connection with a port 83 through the casing 80 for supplying fluid to the chamber 82. Line 63 includes a ball check valve 63a or the like, therein, to prevent back-escape of fluid from the valve 60.

A fluid feed line 84 extends from port 90 in the casing of power demand valve chamber 60 to port 54 in the casing 40 of control valve 38, for interconnecting chamber 82 and the chamber 48. A tap line 85 from the feed line 84 conducts fluid to and from a chamber 87 formed beyond the inner end of piston 81 through an admission and exit port 86 in the casing 80. The piston portion 81b has a reduced extension 81d which abuts the end wall of the bore to prevent full closure of the port 86 and to preserve chamber 87 at the inner end of the piston.

The helical spring 88 mentioned hereinbefore is held in compression between a presser foot 28a of the rod 28 and the outer face of piston portion 81a, thus applying a force to piston 81 which is a function of the actual power demand of plow 11. The applied force preferably is a reduced function of the actual draft load. To achieve the reducing effect, I often employ a relatively heavy helical spring 89 surrounding the spring 88 and compressed between presser foot 28a and the adjacent end of the valve casing 80. With the plow 11 exerting its earth working function or functions under draft by the tractor 10, the reaction force of the soil tends to pivot plow 11 about the pivotal axis of its connection to draft links 18 and the relatively heavy spring 89 is compressed in accordance with the intensity of the actual draft demand of the implement, and yet absorbs a major portion of the force transmitted. This compression, of course, varies with the earth load imposed on the implement by the earth engaging portions 12 and 12a. A reduced function of the draft force or actual power demand of the implement, accordingly, is imparted to the power demand valve piston 81 by the relatively small spring 88.

The hydraulic elements of power demand valve 60 function in the same manner as the corresponding elements of pre-selector valve 59. Accordingly, a fluid pressure is produced in the fluid feed line 84 which is an exact function of the axial force imparted on piston 81 by the small spring 88 and, accordingly, the fluid pressure transmitted to chamber 48 of the master control valve 38 is an exact function of the power demand of the implement upon the prime mover.

Let it be assumed that the actual draft load of the plow 11 upon the tractor 10 is at approximately the value established by compression of spring 70 in valve 59 produced by a particular setting of the related piston 66 and manual control lever 72. Under these circumstances the fluid pressures supplied to chambers 47 and 48 of the control valve by valves 59 and 60 respectively exerts equal opposing forces on the valve piston 43, producing the neutral position of valve 38, so that the piston portions 43a and 43b respectively block ports 44 and 45, leaving port 51 open only to the intermediate chamber 46. The lift motor 15, although in communication through line 52 with the intermediate chamber 46 of selector valve 38 is effectively blocked by the valve piston 43 against operation in either direction. Thus, under these conditions, the earth engaging portions 12 of the plow 11 continue to operate at the same depth.

Should the draft load imposed by the plow 11 on the tractor substantially increase, however, this is reflected by a further compression of the springs 88 and 89 which accordingly urges piston 81 of the power demand valve 60 to the right. The movement of the piston 81 in the manner indicated increases the pressure of the fluid in the control valve chamber 48 as a function of the increased actual draft load of the plow. The increased pressure of the fluid in chamber 48 of the control valve acts upon the adjacent end of the valve piston 43. This causes the piston 43 to move to the left, away from the neutral position of Fig. 1, to the position represented in Fig. 3.

In the position of the control valve 38 represented in Figure 3, pump 56 and valve 57 operate to deliver fluid through the feed lines 63 and 64 to the inlet port 44 of the selector valve. This fluid enters the intermediate chamber 46 and passes through port 51 into the feed line 52 connected with cylinder of lift motor 15. As a result, the lift motor piston 17 is driven to the left in Fig. 1, operating the piston rod 32 and bell-crank 34 to lift the draft links 18 about their pivots 22. The upward movement of the drawbars is applied to the plow 11 at cross shaft 24, causing the plow to be lifted bodily upward. By virtue of reduced earth load on the earth engaging portions 12 and 12a of the plow, the A-frame 25 tends to reduce the compressive force on top link 27 hence reducing the compression in springs 88 and 89. When the compression has been sufficiently relieved by continued lifting of the plow by means of the motor 15, the power demand valve 60 operates to reduce the pressure in the chamber 48 of control valve 38 and the control valve 38 automatically returns to neutral position represented in Fig. 1. The plow 11 at its new level of working in the earth then exerts the substantially constant draft demand on the tractor 10, prescribed by pre-selector valve spring 70.

Should the actual draft demand of the implement fall below the substantially constant value prescribed by pre-selector valve 59, the A-frame 25 of the plow frame functions to reduce the compression in springs 88 and 89 and piston 81 shifts to the left, partially cutting off the port 90 and reducing the pressure in chamber 48. The piston 43 accordingly shifts to the right to the position represented in Fig. 4. In the Fig. 4 position, control valve 38 opens the cylinder of lift motor 15 for the escape of fluid through feed line 52 to port 51, intermediate chamber 46 and exhaust port 45, the latter, as previously mentioned, being suitably connected for returning fluid to the reservoir 55. The selector valve 38 accordingly admits operation of the lift motor 15 by exhaust of the motor cylinder under force of gravity on the plow 11. The plow settles to a lower level in the earth by rotating the drawbars 18 about their corresponding pivots 22.

With plow 11 lowering to a sufficient depth in the earth to give the substantially constant value of draft demand prescribed by the pre-selector valve 59, the earth load on the plow increases and tends to produce clockwise rotation of the plow frame about pivot 24. The A-frame 25 of the plow frame operates through link 27 and rod 28 to increase the compression of springs 88 and 89. Spring 88 accordingly urges the piston 81 inward for expelling fluid from chamber 87, with consequent increase of fluid pressure through tap feed line 84 to chamber 48 of the selector valve 38. Piston 43 accordingly is displaced back to its neutral position.

In a modified embodiment of my invention represented in Figs. 5, 6 and 7, I provide a double acting hydraulic motor 100a which not only is capable of effecting a power stroke for raising the earth working implement, but can also effect a power stroke for lowering the implement. The distribution of fluid to the lift motor to achieve the desired power strokes is controlled by a master control valve 101, the latter conveniently using a shuttle valve type piston 102 capable of occupying neutral position and positions on opposite sides of neutral. To achieve these positions of the master control valve 101, thus to control operation of the lift motor 100 in accordance with maintaining a substantially constant value of draft demand of the earth working implement, I again employ a pre-selector valve 59 and a power demand valve 60 respectively connected to a suitable source of fluid supply, all for example of the character described hereinbefore. In control valve 101, however, the piston 102 includes spaced port controlling portions 102a, 102b and 102c, and intermediate reduced portions 102d and 102e forming a spool-type unit. A casing 104 of the master control valve has a cylindrical sleeve-like portion 104 which receives the piston 102 with the port controlling portions 102a, 102b and 102c suitably sealed to the inside surface thereof and yet free for longitudinal sliding movement. End plugs 105 and 106 are threaded into the sleeve to close off the casing and compress helical springs 107 and 108 against the opposite ends of the piston. There are lift motor control ports 109, 110 and 111 through the casing wall, and in neutral position of the selector valve, as represented in Fig. 5, these ports respectively are closed by the piston portions 102a, 102b and 102c. Movement of piston 102 from neutral position to the position represented in Fig. 6, the latter corresponding to conditions where actual draft demand of the implement is more than the pre-selected substantially constant value, is achieved by operation of the valves 59 and 60 in the same manner as hereinbefore described in connection with the embodiment represented in Figs. 1 to 4, inclusive.

In the Fig. 6 position of the control valve 101, pressured fluid from the source enters port 110 to chamber 113 between the piston portions 102b and 102c thence passes through outlet port 114 through feed line 115 to chamber 116 in the motor cylinder 100. This fluid drives the lift motor to raise the earth working implement. Meanwhile, fluid escapes from chamber 117 (Fig. 5) on the opposite side of the motor piston 100a, through feed line 118 to port 119 and space 112 between the selector valve piston portions 102a and 102b. From here, the fluid passes through outlet port 109 which is connected to a reservoir at the source of fluid supply. Upon the pre-selected constant value of draft demand being regained, valve 60 operates to return the control valve piston 102 to neutral position. Should the actual draft demand fall below the substantially constant value, the valves 59 and 60 operate in the manner described in connection with the embodiment represented in Figs. 1 to 4, inclusive, for shifting the control valve piston 102 to the position represented in Fig. 7. In this position, fluid enters the inlet port 110 from supply, passes into chamber 112 and thence on through port 119 and feed line 118 to chamber 117 of the lift motor. The lift motor piston accordingly is positively driven by fluid to lower the implement and thus increase the implement power demand to the substantially constant value. Fluid on the opposite side of the lift motor piston escapes from chamber 116 and passes through line 115 to 114 and into space 113. From there the fluid exits through port 111, which is connected with the sump of the source of fluid supply for the apparatus. Valve 60 operates to move the control valve piston 102 back to neutral position. This neutral position prevails until actual draft demand again deviates from the substantially constant value which is to be maintained.

Thus it will be seen that in this invention, I provide power demand control apparatus, and systems including power motivated earth working implements, in which the various objects noted together with many thoroughly practical advantages are successfully achieved. It will be seen that the apparatus is highly useful for maintaining the power demand of earth working implements to a pre-selected substantially constant value by automatically shifting the working level of the implement in the earth.

As many possible embodiments may be made of this invention and as many changes may be made in the embodiments hereinbefore set forth, it will be understood that all matter described herein is to be interpreted as illustrative and not as a limitation.

I claim:

1. Apparatus for keeping the power demand of a traversing earth working implement at a pre-selected substantially constant level, said apparatus comprising, fluid motor means for raising said earth working implement, a source of fluid supply to said motor means, a shuttle valve having one end position for admitting fluid to said motor means from supply for raising said earth working implement, an opposite end position for draining fluid from said motor means and lowering of said implement in the earth, and a neutral intermediate position for shutting off the fluid supply to arrest said motor means and maintain the earth working implement at level of working the earth, said shuttle valve including a piston element, and means for applying a hydraulic pressure to said piston element which is a function of the earth load encountered by said earth working implement to urge said shuttle valve towards said one end position, means for applying an opposing hydraulic pressure to said piston element to urge said shuttle valve towards said opposite end position, and means for selectively varying said opposing hydraulic pressure, thereby varying the level of said pre-selected constant power demand.

2. Apparatus for controlling the working level of tractor drawn farm implements, comprising fluid motor means for shifting the implement, means for producing a first hydraulic pressure which is a function of the draft demand of the implement, means for producing a second, substantially constant hydraulic pressure, a source of pressured fluid, a control valve interposed between said source and said fluid motor means, said control valve having a shiftable element controlling the flow of fluid to and from said fluid motor means, said shiftable element having a first position producing fluid flow to operate said fluid motor means in one direction, a second position producing exhaust fluid flow from said fluid motor means, and a neutral position intermediate said first and second positions wherein said fluid motor means is inoperative, and means for applying said first hydraulic pressure to said shiftable element to urge said shiftable element to said one position, and means for applying said second hydraulic pressure to said shiftable element in opposition to said first hydraulic presure to urge said shiftable element to said second position.

3. The combination defined in claim 2 plus manually operable means for selectively varying the magnitude of said second pressure.

4. Apparatus for controlling the working level of tractor drawn farm implements, comprising fluid motor means for shifting the implement, a source of pressured fluid, means for deriving from said source a first hydraulic pressure which is a function of the draft demand of the implement, means for deriving from said source a second, substantially constant hydraulic pressure, a control valve interposed between said source and said fluid motor means, said control valve having a shiftable element controlling the flow of fluid to and from said fluid motor means, said shiftable element having a first position producing fluid flow to operate said fluid motor means in one direction, a second position producing exhaust fluid flow from said fluid motor means, and a neutral position intermediate said first and second positions wherein said fluid motor means is inoperative, and means for applyng said first hydraulic pressure to said shiftable element to urge said shiftable element to said one position, and means for applying said second hydraulic pressure to said shiftable element in opposition to said first hydraulic pressure to urge said shiftable element to said second position.

5. The combination defined in claim 4 plus manually operable means for selectively varying the magnitude of said second pressure.

References Cited in the file of this patent

UNITED STATES PATENTS

| | | |
|---|---|---|
| 2,118,180 | Ferguson | May 24, 1938 |
| 2,356,231 | Ferguson | Aug. 22, 1944 |
| 2,611,306 | Strehlow et al. | Sept. 23, 1952 |
| 2,631,515 | McRae | Mar. 17, 1953 |